United States Patent [19]

Barito et al.

[11] Patent Number: 5,066,437

[45] Date of Patent: Nov. 19, 1991

[54] METHOD FOR INSULATING THERMAL DEVICES

[76] Inventors: Robert W. Barito; Mary O. Barito, both of 9011 Cardiff Rd., Louisville, Ky. 40242

[21] Appl. No.: 495,620

[22] Filed: Mar. 19, 1990

[51] Int. Cl.⁵ .............................................. B29C 67/22
[52] U.S. Cl. ................... 264/46.5; 264/46.6; 264/102
[58] Field of Search ............ 428/69; 52/309.8, 743; 264/46.4, 46.5, 46.6, 46.8, 102, 511; 220/421, 422

[56] References Cited

U.S. PATENT DOCUMENTS

| | | | |
|---|---|---|---|
| 2,164,143 | 6/1939 | Munters | 52/743 |
| 2,617,551 | 11/1952 | Hopkins | 220/421 |
| 2,704,698 | 3/1955 | Patterson, Jr. | 220/421 |
| 2,863,584 | 12/1958 | Latham, Jr. | 220/422 |
| 4,159,359 | 6/1979 | Pelloux-Gervais et al. | 264/332 |
| 4,349,051 | 9/1982 | Schilf | 138/149 |
| 4,417,382 | 11/1983 | Schilf | 29/421 R |
| 4,492,725 | 1/1985 | Ishihara et al. | 428/69 |
| 4,529,638 | 7/1985 | Yamamoto et al. | 428/69 |
| 4,615,856 | 10/1986 | Silverman | 264/511 |
| 4,636,415 | 1/1987 | Barito et al. | 428/68 |
| 4,668,555 | 5/1987 | Uekado et al. | 428/69 |
| 4,681,788 | 7/1987 | Barito et al. | 428/68 |
| 4,745,015 | 5/1988 | Cheng et al. | 428/35 |

FOREIGN PATENT DOCUMENTS 2189183  10/1987  United Kingdom ............... 264/46.6

Primary Examiner—Robert A. Dawson
Assistant Examiner—Allan R. Kuhns

[57] ABSTRACT

A method for insulating thermal devices with a composite insulation system including an evacuated powder and a plastic foam. A formed plastic part divides the insulation space between the outer case and inner liner into sectors. Some sectors are filled with a finely divided powder, the remaining sectors are filled with foam, for example, polyurethane. A vacuum is applied to the powder filled sectors while the foam is expanding and curing.

2 Claims, 4 Drawing Sheets

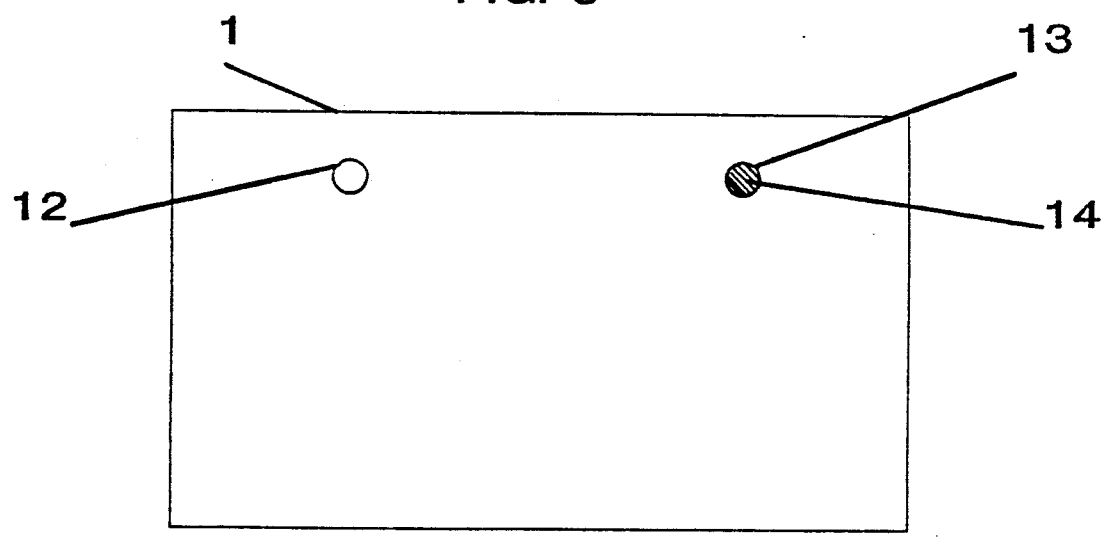

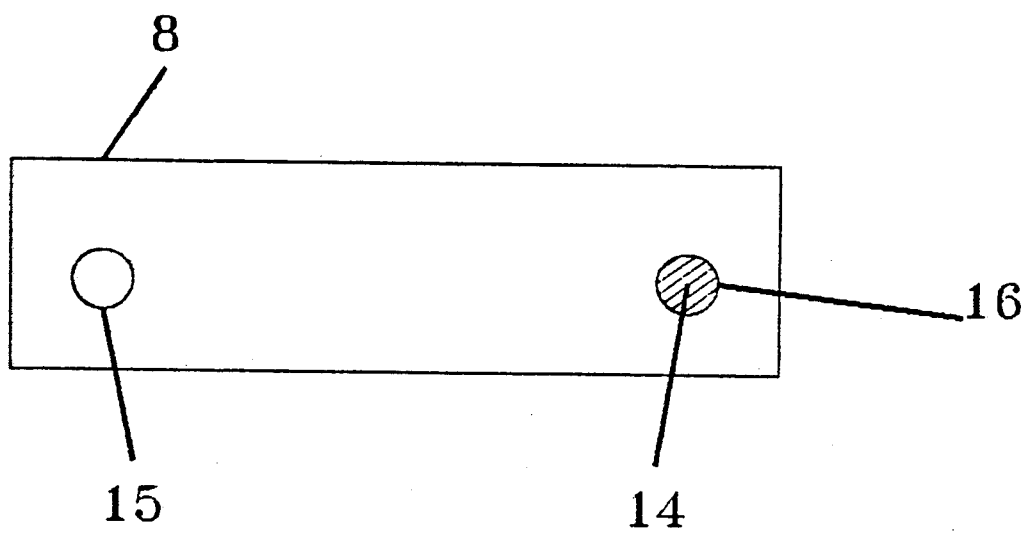

METHOD FOR INSULATING THERMAL DEVICES

BACKGROUND OF THE INVENTION AND PRIOR ART

The present invention relates to a method for insulating thermal devices, such as electric freezers, refrigerators, refrigerated containers or the like with a low conductivity, evacuated powder insulation.

Numerous materials heretofore have been used to retard heat flow. These materials include such thermal insulations as glass fiber, and organic foams like polystyrene, polyurethane, and polyisocyanurate. A relatively new class of thermal insulators are evacuated, powder-filled panels. A comparison of the thermal insulating properties of these insulating materials is presented in Table 1.

TABLE 1

| INSULATION MATERIAL | INSULATING GAS | THERMAL CONDUCTIVITY K FACTOR (BTU-IN/HR-SQFT-DEG F) | THERMAL RESISTANCE R FACTOR (HR-SQFT-DEG F/BTU-IN) |
|---|---|---|---|
| GLASS FIBER | AIR | 0.32 | 3.13 |
| POLYSTYRENE FOAM | AIR | 0.23 | 4.35 |
| POLYURETHANE FOAM | CFC | 0.12 | 8.33 |
| POLYISOCYANURATE FOAM | CFC | 0.12 | 8.33 |
| EVACUATED POWDER INSULATION | VACUUM | 0.04 | 25 |

As can be seen from Table 1, those materials containing chlorofluorocarbon (CFC) gas have conductivities that are approximately a third to a half the conductivity of the air filled materials. Partly because of this lower conductivity, CFC containing insulation has replaced air filled insulation in many applications. Evacuated powder insulation has a conductivity that is considerably lower than insulation containing air or CFC gas. Applications of this insulation concept have been slow in developing. This has been caused, mainly, by the high cost to manufacture the evacuated insulation.

Thermal insulation is a key parameter in the worldwide energy equation. A reduction in energy usage was realized when CFC blown rigid foams were developed and used in thermal insulation applications. The discovery that CFC's are reducing the stratospheric ozone and thus increasing the amount of destructive UV radiation reaching the earth's surface, has resulted in an international agreement to restrict the future production of CFC's. If viable alternatives are not developed, these restrictions will result in increased energy demands.

At present the only alternatives to foams containing CFC's are foams blown with carbon dioxide or hydrogen containing chlorofluorocarbons (HCFC's). Carbon dioxide and HCFC blown foams are about 10-33% higher in thermal conductivity than CFC blown foams. For this reason, if either carbon dioxide or HCFC were to be substituted for CFC in urethane foam applications, there would be a significant increase in the worldwide energy consumption. Evacuated powder insulation is about 66% lower in conductivity than CFC blown foams. By making a composite insulation system based on an HCFC or a carbon dioxide blown foam with evacuated powder insulation, CFC's can potentially be eliminated in insulating foam and replaced by systems with lower overall conductivity.

The rate at which heat is transferred through thermal insulation is dependent upon the type and thickness of the insulation. Table 2 shows a comparison of thermal properties for urethane foam blown with CFC and carbon dioxide. The table also shows the thermal properties for each of these foams in a composite insulation system with evacuated powder panels. So as to make a valid comparison, the overall insulation thickness was the same for each of the insulation materials. It is readily apparent from Table 2 that thermal conductivity of any of the composites is lower than the conductivity of either the CFC or the carbon dioxide blown foams.

Since the evacuated powder panels have the largest effect on the conductivity of the composite, it is important that they cover as much of the insulated surface area as possible. Many thermal devices, for example, refrigerators, freezers and walk-in coolers have large flat areas that require insulation. The current evacuation chamber technology is not capable of making panels large enough to cover these large areas with a single panel. As a consequence, these large surface areas require several smaller evacuated powder panels. This results in greater heat leakage through a given wall than would be experienced if the wall were covered by a single panel.

TABLE 2

| INSULATION MATERIAL/GAS | INSULATION THICKNESS (INCHES) | THERMAL CONDUCTIVITY K FACTOR (BTU-IN/HR-SQFT-F) | THERMAL RESISTANCE R FACTOR (HR-SQFT-F/BTU-IN) |
|---|---|---|---|
| URETHANE FOAM/CFC | 1.5 | 0.12 | 12.5 |
| URETHANE FOAM/CARBON DIOXIDE | 1.5 | 0.16 | 9.375 |
| URETHANE FOAM/CFC EVACUATED POWDER | 1.0 0.5 | 0.072 | 20.83 |
| URETHANE FOAM/CFC EVACUATED POWDER | 1.3 0.2 | 0.092 | 16.30 |
| URETHANE FOAM/CARBON DIOXIDE EVACUATED POWDER | 1.0 0.5 | 0.082 | 18.29 |
| URETHANE FOAM/CARBON DIOXIDE EVACUATED POWDER | 1.3 0.2 | 0.114 | 13.16 |

This new class of insulating materials, namely, evacuated insulation panels, are costly to manufacture and install in thermal devices. These evacuated panels consist of a finely divided powder, a microporous pouch, and a gas barrier, water-tight envelope.

A method of fabricating evacuated insulation panels is as follows:

1. A microporous pouch is filled with a given quantity of finely divided powder, so as to yield, after compaction, a panel with a density of between 10 and 20 pounds per cubic foot.
2. The pouch is sealed.
3. The microporous pouch containing the powder is placed in an oven and dried for several hours to remove the adsorbed moisture. An alternative to this step, is to dry the powder prior to filling the pouch.
4. After removal from the oven, the pouch is placed in a gas barrier, water-tight envelope and compacted to the desired thickness. This compaction yields a rigid, board-like panel.
5. The rigid, board-like panel is placed in an evacuation chamber, evacuated to a pressure of approximately 2 millibars and sealed.

The finished panels are then, generally, attached, as by adhesive, to the wall(s) of the thermal device to be insulated and then foamed-in-place with a liquid, organic material, such as polyurethane.

It is an object of the present invention to provide a simple method of insulating thermal devices with evacuated powder and organic foams.

It is another object of the present invention to reduce the costs associated with the manufacture and the application of evacuated powder insulation to thermal devices.

It is a further object of the present invention to reduce the heat leakage into thermal devices, such as refrigerators and freezers, by insulating more of the wall area with the evacuated powder than can be insulated with evacuated panel insulation. A secondary effect of greater wall coverage is that there will be less surface heat leakage from the hot side of the evacuated panel to the cold side. This type of heat transfer is often referred to as "edge loss".

Further objects and advantages of this invention will become apparent as the description of the invention proceeds and the novel features of the invention are pointed out in the claims, which form part of this specification.

U.S. Pat. No. 4,636,415, entitled "Precipitated Silica Insulation", Barito et al, Jan. 13, 1987 and U.S. Pat. No. 4,681,788 entitled "Insulation Formed of Precipitated Silica and Fly Ash", Barito et al, July 21, 1987, describe evacuated panels containing precipitated silica and precipitated silica and fly ash. These panels may be used to insulate a space by having the panel form part of the walls surrounding the space to be thermally insulated. These patents teach that these panels are particularly suited for applications where they can be sandwiched between a double wall. Further, they teach that these panels can be used in refrigerators and freezers by bonding the panels to the inside wall of the outer case or the inside wall of the inner liner and then filling the remaining insulation space between the two walls with polyurethane foam.

The high costs of materials, labor, and equipment to fabricate evacuated insulation panels and to assemble them in thermal devices have contributed to the slow growth of this technology. The present invention greatly reduces these costs.

Current evacuated panel fabrication technology is limited to panel sizes that are smaller than the insulation area of most thermal devices. Therefore, it is necessary, when insulating a large area, to use several panels. When the panels are fabricated there are sealing flaps on the four edges. For devices that are to be foamed after the installation of the panels, these flaps can cause voids in the foam due to entrapped air. To minimize this problem, there are generous spaces between panels in the insulation cavity. Because of the spacing of the panels, on most refrigerators, and like devices, the maximum area that can be insulated with evacuated panels is about 50% of the total available insulation area. This results in a greatly reduced area that is insulated with the lower conductivity, evacuated powder insulation. The present invention makes it possible to insulate more than 90% of the available insulation area with low conductivity evacuated powder insulation.

DESCRIPTION OF THE DRAWINGS

FIG. 1 shows a formed plastic part 4 that is bonded, as by adhesive 3, to the inside of the cabinet outer case 2 and thus forms an enclosure 5 within the insulation space of the cabinet 1. This enclosure 5 is the powder sector of the insulation system. A second enclosure 7 is formed by the cabinet inner liner 6 and the formed plastic part 4. This enclosure 7 is the foam sector of the insulation system.

FIG. 2 shows a formed plastic part 10 that is bonded, as by adhesive 3, to the inside of the door outer case 9. This enclosure 5 is the powder sector of the insulation system. A second enclosure 7 is formed by the inner door 11 and the formed plastic part 10. This enclosure 7 is the foam sector of the insulation system.

FIG. 3 is a top plan view of a cabinet 1 for a thermal device. FIG. 3 shows two openings 12, 13 in the cabinet 1 that extend from the outside of the cabinet 1 into the powder sector of the insulation system. One opening is a fill port 12 and the other opening is an evacuation port 13. The evacuation port contains a microporous filter 14.

FIG. 4 is a top plan view of a door 8 for a thermal device. FIG. 4 shows two openings 15, 16 in the door 8 that extend from the outside of the door 8 into the powder sector of the insulation system. One opening is a fill port 15 and the other opening is an evacuation port 16. The evacuation port contains a microporous filter 14.

BRIEF DESCRIPTION OF THE INVENTION

Figure 1:
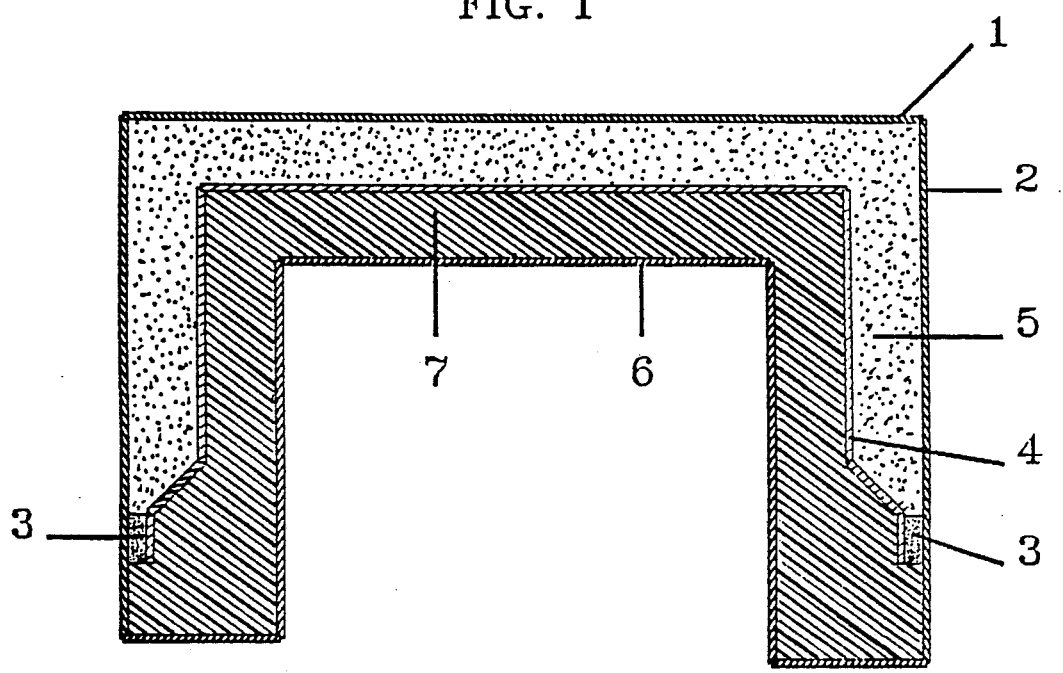
FIG. 1 discloses a horizontal sectional view of a cabinet 1 for a thermal device.

The present invention is a method for insulating thermal devices, for example, refrigerators, freezers, and coolers. The insulating materials used in this method are finely divided powders and a material that can be foamed-in-place, for example, polyurethane. The use of these materials for thermal insulation in the above applications are well known. It is the object of the present invention to utilize these materials in the insulation of thermal devices in a simplified, less costly process than has been used to date.

A dry, finely divided power is charged to the enclosures 5 between the outer walls 2, 9 and the formed plastic parts 4, 10 by means of the fill ports 12, 15. When the enclosures 5 are full, the fill ports are sealed and the powder is compressed. The compression of the powder at this time in the process is optional, since it will be compressed by the foam during the foaming operation. The cabinet inner liner 6 and the door inner liner 11 are attached to the cabinet and the door. The assembled cabinet and door are placed in fixtures for foaming. Foamable material is injected into the insulation cavities 7 between the formed plastic parts 4, 10 and the inner liners 6, 11. While the foam is expanding, the enclosures 5, which contain the powder, are evacuated by means of the evacuation ports 13, 16. The microporous filter 14 allows the air to be evacuated from the powder sector, without withdrawing any of the powder. When the foaming and evacuation processes are complete, the evacuation ports 13, 16 are sealed and the insulated parts are removed from the foam fixtures.

DESCRIPTION OF THE PREFERRED EMBODIMENTS

Figure 2:
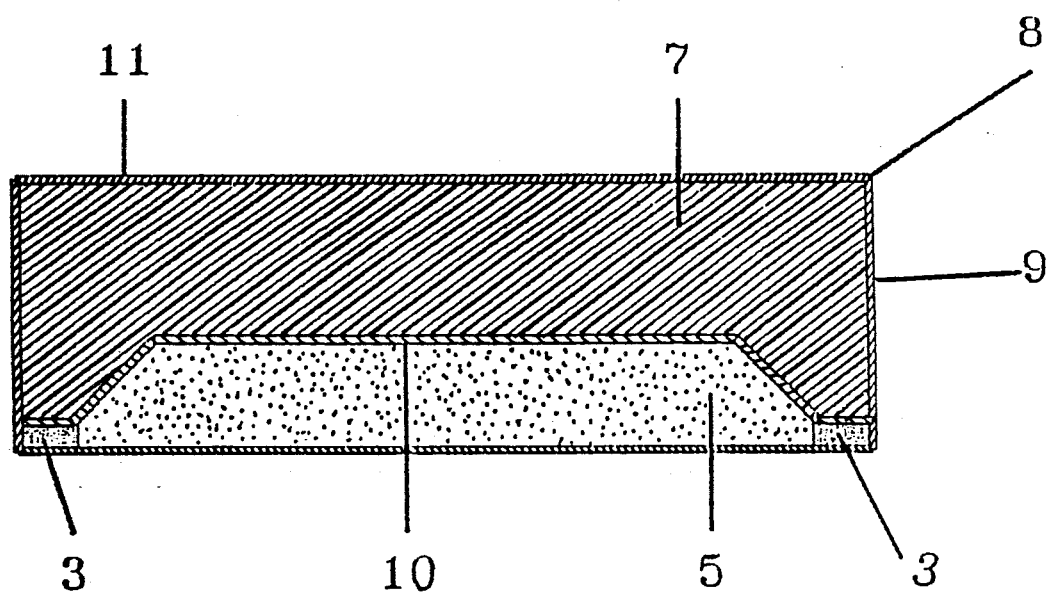
FIG. 2 discloses a horizontal sectional view of a door 8 for a thermal device.

The present invention is a method for insulating thermal devices with a composite insulation system that consists of an evacuated powder and a plastic foam. This is achieved by dividing the insulation space in the device into two sectors 5, 7. One sector 5 is filled with a finely divided, dry powder and the other sector 7 is filled with a plastic foam. The two sectors are illustrated in FIG. 1 and FIG. 2. A vacuum is drawn on the sectors 5 of the powder insulation while the foam is expanding in the other sectors 7. In practice, depending upon the volume of powder and the level of vacuum needed, it may be necessary to draw the vacuum longer than just during the foaming process.

The present-day procedure for insulating most thermal devices, for example, refrigerators, freezers and coolers, is to inject a foamable material into the insulation space between the outer case and inner liner and allow it to expand, unrestricted, until the foam fills the entire insulation space. In these devices, prior to injecting the foamable material, or soon thereafter, the entire device is placed in a foam fixture. The fixture fits snugly against the outer walls and the inner walls of the thermal device and prevents the pressure of the expanding foam from distorting the device. The method of the present invention could easily be integrated into the present-day procedure for insulating thermal thermal devices. The method of the present invention for insulating a thermal device is as follows:

1. Formed plastic parts 4, 10 are bonded, as by adhesive 3, to the outer cases 2, 9.
2. The inner liners 6, 11 are attached to the outer cases.
3. Dry powder is poured through the fill ports 12, 15 into the insulation spaces 5.
4. When the insulation spaces 5 are filled, the fill ports 12, 15 are sealed.
5. The thermal devices 1, 8 are placed in foam fixtures.
6. Foam is injected into the foam sectors 7.
7. While the foam is expanding and curing, a vacuum is drawn on the powder sectors 5 through the evacuation ports 13, 16 which contain microporous filters 14.
8. When the foam has completed the cure cycle and the powder sectors 5 have been evacuated to the desired degree of vacuum, the evacuation ports 13, 16 are sealed.
9. The thermal devices 1, 8 are removed from the foam fixtures.

It should not be construed from the foregoing description that the evacuated powder insulation has to be applied to all walls in the thermal device. The thickness and area to be covered by the evacuated powder and, likewise, the foam, will be dependent upon the designed heat leakage of the device.

What is claimed is:

1. A method of insulating thermal devices with a composite insulation system bounded by spaced walls comprising the following steps:
    dividing the spaced walls of the thermal device into two sectors,
    filling one of the two sectors through a fill port with a powder,
    sealing the powder fill port,
    filling the other sector with a plastic foamable material,
    applying vacuum to the powder filled sector, through an evacuation port, while the plastic foamable material is expanding and curing, and
    sealing the evacuation port while maintaining the vacuum.

2. Method according to claim 1 wherein said sectors are divided by a plastic partition.

* * * * *